United States Patent
Odell et al.

(10) Patent No.: US 6,410,637 B1
(45) Date of Patent: Jun. 25, 2002

(54) WATER-BASED COMPOSITION FOR COATING A DONOR MEMBER

(75) Inventors: Peter G. Odell, Mississauga (CA); Richard D. Hunt, Rochester; Thomas Thomson, Fairport, both of NY (US); Yvonne J. M. Groot, Horst (NL); Jas Paul S. Dhillon, Pittsford; Michael F. Zona, Holley, both of NY (US)

(73) Assignee: Xerox Corporation, Stamford, CT (US)

( * ) Notice: Subject to any disclaimer, the term of this patent is extended or adjusted under 35 U.S.C. 154(b) by 16 days.

(21) Appl. No.: 09/722,347

(22) Filed: Nov. 28, 2000

(51) Int. Cl.[7] .......................... C08K 3/04; C08L 61/06; C08L 29/04; B32B 27/42
(52) U.S. Cl. ................... 524/495; 524/596; 524/803; 524/818; 252/511; 430/627; 428/524
(58) Field of Search ................................... 524/495, 803, 524/818, 596; 252/511; 430/627; 428/524

(56) References Cited

U.S. PATENT DOCUMENTS

| 4,545,926 A | * | 10/1985 | Fouts, Jr. et al. |
| 5,340,676 A | * | 8/1994 | Anderson et al. |
| 5,389,403 A | * | 2/1995 | Buckley et al. |
| 5,800,973 A | * | 9/1998 | Anderson et al. |
| 5,849,472 A | * | 12/1998 | Wang et al. |

* cited by examiner

*Primary Examiner*—Tae H. Yoon
(74) *Attorney, Agent, or Firm*—Oliff & Berridge, PLC

(57) ABSTRACT

A waterborne coating composition for application to a donor member surface includes a resin binder, a conductive particle material, an additional particle material of either (1) graphite particles with a dispersant of polyacrylamide, polyethylene oxide, polyvinyl alcohol or mixtures thereof or (2) crosslinked polymer particles, and water. The waterborne coating composition exhibits superior stability and achieves suitable properties when coated upon a donor member surface, thereby permitting practical replacement of volatile organic components typically used in donor member coating compositions.

25 Claims, 1 Drawing Sheet

WATER-BASED COMPOSITION FOR COATING A DONOR MEMBER

BACKGROUND OF THE INVENTION

1. Field of the Invention

The present invention relates to coatings for ionographic or electrophotographic, including digital and image on image, imaging and printing apparatuses and machines, and more particularly is directed to coatings for donor members. The present invention particularly relates to waterborne polymeric coatings for developer, or donor, members, used in electrophotographic (electrostatographic) image development systems, e.g., single-component development systems.

2. Discussion of Background Art

In xerography, or electrophotographic printing, a charge retentive surface called a photoreceptor is electrostatically charged, then exposed to a light pattern of an original image to selectively discharge the surface in accordance with the image, i.e., imagewise. The resulting pattern of charged and discharged areas on the photoreceptor form an electrostatic charge pattern (a latent image) conforming to the original. The latent image is developed by contacting it with a finely divided electrostatically attractable powder called toner. Toner is held on the image areas by the electrostatic charge on the photoreceptor surface. Thus, a toner image is produced in conformity with a light image of the original being reproduced. The toner image may then be transferred to a substrate or support member (an image receiving substrate) such as paper or a transparency, and the image is affixed to the substrate to form a desired permanent image on the substrate. After development, excess toner left on the charge retentive surface is cleaned from the surface.

The step of conveying toner to the latent image on the photoreceptor is known as development. The object of effective development of a latent image on the photoreceptor is to convey toner particles to the latent image at a controlled rate so that the toner particles effectively adhere electrostatically to the appropriately-charged areas on the latent image.

A commonly used development technique involves a single-component developer material. In a typical single-component development system, each toner particle has both a magnetic property, to allow the particles to be magnetically conveyed to the photoreceptor, and an electrostatic charge, to enable the particles to adhere to the photoreceptor. In such a system, the developer, or donor, member, is typically in the form of a cylindrical sleeve which rotates about a stationary magnet assembly. The magnetized toner particles adhere to the rotating sleeve by the force of the stationary magnets within the sleeve. As the sleeve rotates around the magnets, particles adhering to the sleeve are exposed to an alternating series of magnetic polarities. The developer roll has a conductive coating which facilitates the adherence of toner to its surface. The coating typically includes a conductive pigment and a binder composition.

In the art, donor member surface coatings are typically formed from organic solvent based compositions, for example with ethanol, acetone and/or methyl ethyl ketone. Following application of the coating composition, these volatile organic solvents must be removed, which requires the use of emissions recovery and processing equipment that must be "explosion proof."

The option of eliminating organic solvents from the donor member coating procedures thus has many potential benefits. It eliminates the need to build a coating plant to the stringent and costly Class I Division I or II (explosion proof) specifications for the use of flammable liquids. Since engineering controls, such as classified rooms and fume hoods, can only reduce the risk, there is a health and safety benefit to the plant operators in replacing organic solvents with water. The need to reclaim, destroy or account for the volatile organic compound (VOC) emissions is removed, which also provides cost savings. Also, by reducing or even eliminating VOC emissions, the plant design can be consistent in many locations, despite any variations in local regulations.

SUMMARY OF THE INVENTION

Problems exist in eliminating organic solvents from the coating compositions, for example by attempting to use water as the solvent of the coating composition. In particular, stability of the water-based dispersion over time, foaming of the dispersion, and the presence of pinholes in the coating derived from a waterborne coating are practical problems that have prevented practical use of water-based coatings upon donor members.

It is thus one object of the present invention to develop a water-based composition for coating a donor member surface that overcomes the above-mentioned problems.

It is a still further object of the present invention to develop a donor member coated with a water-based coating composition which possesses properties permitting the donor member to function without problems, i.e., a donor member functioning nearly identical to a donor member coated with an organic solvent based coating.

These and other objects are achieved by the present invention.

In a first aspect, the present invention relates to a waterborne coating composition comprising a resin binder, a conductive particle material, an additional particle material selected from the group consisting of (1) graphite particles with a dispersant of polyacrylamide, polyethylene oxide, polyvinyl alcohol or mixtures thereof and (2) crosslinked polymer particles, and water.

In a further aspect, the invention relates to a donor member coated with the waterborne coating composition, and also to an imaging device including such coated donor member.

In a still further aspect, the invention relates to a method of preparing a donor member coating composition, comprising mixing a resin binder, a conductive particle material, an additional particle material selected from the group consisting of (1) graphite particles with a dispersant of polyacrylamide, polyethylene oxide, polyvinyl alcohol or mixtures thereof and (2) crosslinked polymer particles, and water to provide the donor member coating composition.

The waterborne coating composition exhibits superior stability and achieves suitable properties when coated upon a donor member surface, thereby permitting practical replacement of volatile organic components typically used in donor member coating compositions.

DETAILED DESCRIPTION OF PREFERRED EMBODIMENTS

Figure 1:
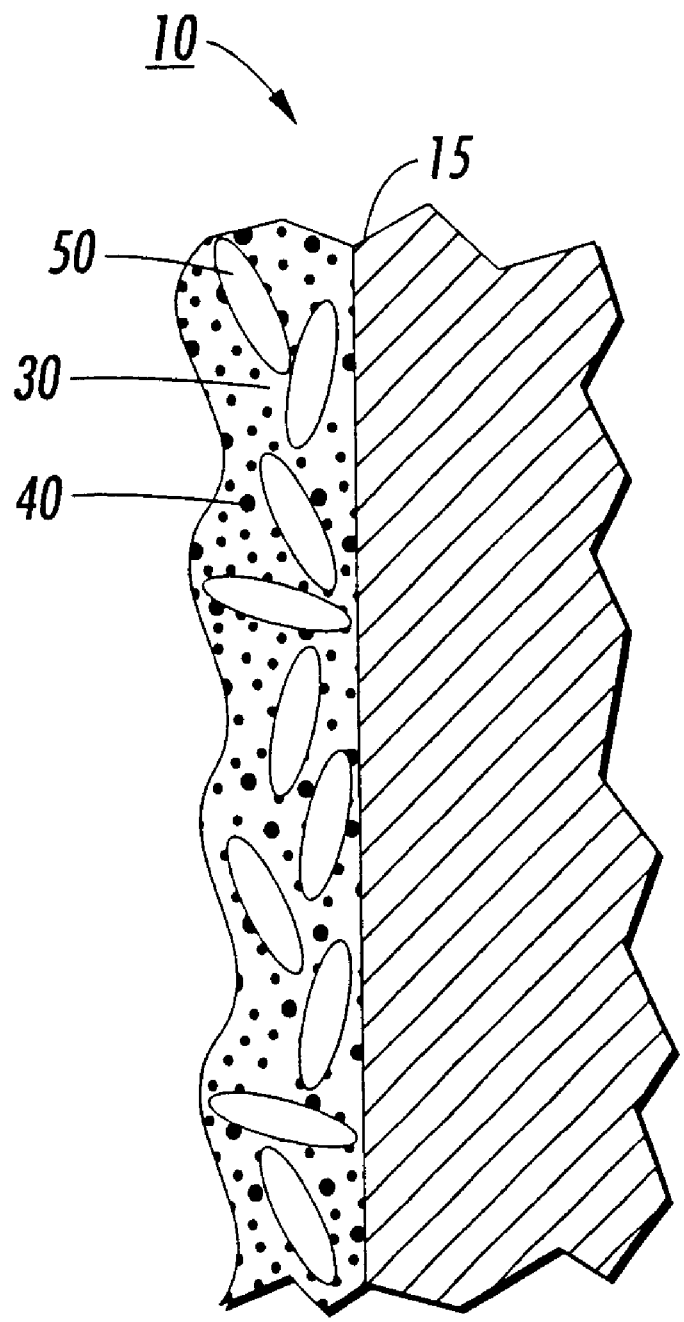
FIG. 1 is a sectional view illustrating the surface of a donor member coated with the coating composition of the present invention.

The present invention relates to improved donor member surface coatings which are made via an environmentally friendly process and without the drawbacks of prior attempts at a water-based donor member coating. Before the present invention, grinding of pigment into water-based phenolic resins, unlike organic-based coatings, was very likely to result in dispersion thickening and foaming. In extreme cases this foam is very stiff (meringue-like) and unsuitable for coating. The thickening or foaming is problematic in that even small amounts of air entrainment in the coating can result in coating defects.

The present invention provides for water-based coating materials which allow for preparing donor members advantageously avoiding thickening and foaming, i.e., undesirable air entrainment. Donor members coated with the waterborne coatings of the present invention are capable of forming high quality images with solid area development greater than 1.3 and the absence of ghosting.

By "waterborne" as that term is used herein is meant a composition that contains water as the solvent. Waterborne coatings include coatings in accordance with the present invention which have water as a substantial part of the carrier portion of the coating composition, e.g., greater than 50%, 75%, 80%, 85%, 90% or 95% of the carrier. While other solvents may be included, it is more desirable that the composition be mostly water to preserve the benefits of little or no VOC emission. Most preferably, a waterborne coating excludes the presence of volatile organic solvents, including ethanol, acetone and methyl ethyl ketone.

"Donor roll coating precursor composition" includes compositions of the invention which are prepared prior to rotor stator mixing and/or high pressure communition, i.e., compositions including a combination of a resin binder, a conductive particle material, an additional particle material selected from the group consisting of (1) graphite particles with a dispersant of polyacrylamide, polyethylene oxide, polyvinyl alcohol or mixtures thereof and (2) crosslinked polymer particles, and water.

The waterborne coating composition of the present invention comprises a resin binder, a conductive particle material, an additional particle material selected from the group consisting of (1) graphite particles with a dispersant of polyacrylamide, polyethylene oxide, polyvinyl alcohol or mixtures thereof and (2) crosslinked polymer particles, and water.

In preferred embodiments, the resin binder is a phenolic resin such as Durez 33304 (Occidental Chemical Corporation) or BB 317 (Neste Resins Canada). "Phenolic resin" includes art-recognized compositions falling under this classification, e.g., phenol-formaldehyde resins/resoles. Phenolic resins made by combining an excess of formaldehyde with phenolic compounds are typically alkaline, imparting the potential for such resins to be waterborne.

The conductive particle material is most preferably selected from among carbon black, magnetite, nigrosine or combinations thereof. Preferentially, carbon black is used. A commercially available carbon black that may suitably be used is Conductex 975 from Columbia Chemical Corp.

The coating composition also contains an additional particulate material that imparts surface roughness to the coating. In the present invention, it has been found that either of two types of particulate materials may be used in the waterborne coating, in particular either (1) graphite particles with a dispersant of polyacrylamide, polyethylene oxide, polyvinyl alcohol or mixtures thereof or (2) crosslinked polymer particles.

The coating dispersions of the present invention need to be able to remain stable for weeks. It has been found that graphite alone is especially prone to settling out of the dispersion. The agglomeration of graphite and the change in dispersion viscosity leads quickly to coating failure, often in less than 24 hours. After such failure, mechanical redistribution of the dispersion is rarely successful.

However, use of the graphite along with inclusion of polymeric surfactants increases the stability of the graphite dispersion. The polymeric dispersants are typically water soluble polymers from the group including polyacrylamide, polyethylene oxide, and polyvinyl alcohol. Most preferably, the dispersant is polyvinyl alcohol. Relative to the graphite, about 0.2% to about 30%, preferably about 1% to about 20% by weight of the dispersant is present.

A particularly preferred commercial graphite product that may be used in this invention is Timcal 1050 from Timcal America Inc. This is a synthetic graphite that contains a polymer dispersant. Coating dispersions made with this graphite may be successfully used over a period of weeks, and any decline in coating quality can be readily reversed with simple redispersion via known techniques (e.g., mixing with a rotor stator mixer).

Alternatively as the particulate material, it has been found that crosslinked polymer particles may be used instead of graphite. Most preferably, the crosslinked polymer particles are capable of dispersion in the waterborne coating without causing any substantial thickening or foaming. As a preferred class of crosslinked particles, mention may be made of crosslinked formaldehyde-containing polymers, most preferably benzoguanine formaldehyde crosslinked polymers. L-15, a 15.0 micron benzoguanine formaldehyde from Esprit Chemical Co. may suitably be used.

Other crosslinked polymer particles may be used, even polymers that may cause foaming and/or thickening, so long as the crosslinked particles are added along with anti-foaming agents, dispersants and/or surfactants well known in the art in amounts effective to substantially suppress the foaming and/or thickening. An example particle may be crosslinked polymethyl methacrylate that requires anti-foaming agents to suppress foaming otherwise exhibited upon addition of the crosslinked PMMA to the waterborne composition.

The graphite or crosslinked polymer particles are most preferably of a uniform size. These particles typically have a size similar to that of toner particles or less. The size may be, for example, about 30 microns or less, preferably about 15 microns to 25 microns, in average particle size (for example as measured by a light scattering or scanning electron microscopy).

FIG. 1 illustrates a sectional view of the coating 10 applied to the surface 15 of a donor member. The coating is illustrated to comprise resin binder 30, conductive particles 40, for example carbon black as discussed above, and additional particles 50 such as graphite or crosslinked polymers that impart roughness to the surface coating. As can be seen, the particles providing surface roughness have a much larger size than the conductive particles in the preferred embodiment illustrated.

The total solids loading of the coating dispersion is from, for example, about 25% to about 30% in water.

When graphite with dispersant is used as the additional particle material of the composition, the solids component consisting of from, for example, about 50 weight % to about 75 weight % and more preferably about 55 to about 65 weight % of the waterborne resin, about 5 weight % to about 20 weight % and more preferably about 9 to about 13 weight % of the conductive particle material (e.g., carbon black)

and about 20 weight % to about 40 weight % and more preferably about 26 to about 30 weight % of graphite.

When crosslinked particles are used as the additional particle material of the composition, the solids component consisting of from, for example, about 50 weight % to about 75 weight % and more preferably about 55 to about 65 weight % of the waterborne resin, about 5 weight % to about 25 weight % and more preferably about 14 to about 19 weight % of the conductive particle material (e.g., carbon black) and about 20 weight % to about 40 weight % and more preferably about 26 to about 30 weight % of crosslinked particles. As can be seen, when crosslinked polymer particles are used as the additional particle material, additional carbon black may need to be added in order to achieve similar resistivity in the coating as when graphite (which also contributes to conductivity) is used.

The waterborne coating composition is most preferably made by first combining the resin binder, the conductive particle material, the additional particle material selected from the group consisting of (1) graphite particles with a dispersant of polyacrylamide, polyethylene oxide, polyvinyl alcohol or mixtures thereof and (2) crosslinked polymer particles, and water to provide a donor member coating precursor composition; and then mixing the donor member coating precursor composition to provide the donor member coating composition.

Where crosslinked polymer particles are used, the mixing preferably comprises only mild mixing, for example mixing with a rotor stator mixer at rpm's of, for example, 15,000 or less. More aggressive mixing can result in fracture of the microspheres. The mixing can be effected for a short time, for example 30 seconds to 10 minutes, although more or less mixing may be required.

Where graphite and dispersants are used as the additional particulate material, the mixing preferably includes, in addition to optional mixing with a rotor stator, subjecting the donor member coating precursor composition to high pressure communition.

The high pressure communition may be carried out using a device such as a piston homogenizer, e.g., single stage or two stage piston homogenizers. High pressure communition devices such as piston homogenizers or a Microfluidizer® share a similar mechanism of particle breakdown. Both drive a fluid at high pressure through a small orifice, the homogenizer valve in the former, and the interaction chamber in the latter. The resulting shear and cavitation breaks down agglomerates and disperses particles in the fluid. With a piston homogenizer, a second stage valve can also be employed to reduce the fluid viscosity that often increases after the first stage disperses the colloidal pigments. While both types of devices are applicable, a piston homogenizer is more readily operated and serviced. These devices also offer much faster throughput than media mills.

Various process options are available with a piston homogenizer including various pressures, number of passes through the homogenizer valve, and the valve configuration itself. Good results have been obtained with a pressure of from, for example, about 1000 to about 1500 bar, preferably about 1100 to about 1200 bar. Near equivalent results can also be achieved by two passes through the homogenizer at 800 bar.

The foregoing materials and methods advantageously provide a donor member coating which is substantially free of air pockets or defects.

The coating compositions of the invention are most preferably used to provide improved donor member coatings as well as overcoatings for electrophotographic development sub-system donor members, and may also be used to protect electrodes on a donor member from wear, and/or to prevent electrical shorting with a developer material's conductive carrier beads.

The donor members of the present invention are most preferably in roll form, i.e., the substrate comprises a cylindrical shaft, although other forms such as belts may also be used.

The waterborne coating is coated upon the donor member substrate by any suitable method including, for example, dip or spray coating. Most preferably, the coating process includes a recirculation reservoir, for example as found in mini-coaters, through which the coating composition cycles during the coating process. Following coating, the donor member coating is then cured via any suitable technique, for example application of heat.

In another embodiment, the invention encompasses an image forming apparatus having a charge-retentive surface for receiving an electrostatic latent image; and a donor member to apply/supply a developer material to the charge-retentive surface to develop the electrostatic latent image and form a developed image on the charge retentive surface. The donor member is coated with a waterborne donor member coating composition of the invention. The image forming apparatus further includes a transfer component to transfer the developed image from the charge retentive surface to an image receiving substrate; and a fixing component to fuse the transferred developed image to the image receiving substrate.

One aspect of the present invention includes apparatus for applying toner particles on a charge-retentive surface to develop an electrostatic latent image on the charge-retentive surface. A donor member such as a roll, rotatable in a process direction, conveys toner particles on a surface thereof from a supply of toner particles to a development zone close to the charge-retentive surface.

Since the art of electrophotographic printing is well known, the various processing stations employed in a printing machine need only be described briefly.

In an example electrophotographic printer, a document to be reproduced is placed on a platen where it is illuminated by a light source such as a tungsten halogen lamp. The exposed document is imaged onto the photoreceptor by a system of mirrors. The source of the original image to be printed may alternatively be a raster output scanner (ROS), wherein a laser source moving across the photoreceptor selectively discharges the photoreceptor in accordance with digital image data. The photoreceptor may be in the form of a rotating drum, belt, etc. The optical image selectively discharges the surface of the photoreceptor in an image configuration, resulting in an electrostatic latent image of the original document recorded on the drum at the imaging station. The photoreceptor drum rotates so that the latent image is moved towards the development unit, where the electrostatic latent image is developed, by the application of toner particles, into visible form. In a single-component development system, toner from a supply hopper is gradually conveyed by a rotating developer roll to a development zone adjacent the latent image recorded on the photoreceptor drum.

The development unit may work as follows. The developed image is transferred at the transfer station from the photoreceptor drum to a sheet of paper, which is delivered from a paper supply system into contact with the drum in synchronous relation to the image thereon. At the transfer station, a transfer corotron provides an electric field to assist in the transfer of the toner particles from the photoreceptor drum to the copy sheet. Individual sheets are introduced into the system from a stack of supply paper by a friction feeder. The image is subsequently fused onto the paper in known manner at a fusing station and the finished copy is deposited in hopper. After the toner on the drum is transferred to the paper, residual toner is removed from the surface of the photoreceptor drum, for example by a cleaning blade, and then the surface is recharged, as by charging corotron, for imagewise discharging of the photoreceptor in a subsequent cycle.

As typically constructed for a commercial application, a single-component development unit is encased in a developer housing. The main part of the developer housing may be an enclosed space which accommodates a toner cartridge. A toner cartridge typically includes a rotatable agitator, which engages a rotating driver in the apparatus. The purpose of the agitator is generally to keep the single-component developer (toner) well-mixed and aerated, so that toner will flow easily and will not coagulate in one area of the toner cartridge. Such an agitator may also be useful in moving toner particles out of the toner cartridge at a consistent rate. A toner cartridge typically includes at least one opening defined therein, so toner may be gradually taken out of the toner cartridge.

The elements of a developer roll in a single-component development system may include a stationary magnet assembly, enclosed within a rotating cylindrical sleeve. Stationary magnet assembly includes a plurality of permanent magnets, with each magnet extending substantially the length of the developer roll, and being arranged so that a selected pole of each magnet is exposed outward. The alternating polarities of the magnets create magnetic flux lines which extend outward toward the outer surface of the sleeve. In a typical single-component developer system, the toner particles have magnetic properties associated therewith, for example by virtue of a significant iron content, but generally no specific magnetic polarity. The magnets on the magnetic assembly generally cause the toner particles to adhere to the surface of outer sleeve, and the rotation of outer sleeve causes the toner particles to, in effect, move around the developer roll from the toner cartridge side of the developer roll to a development zone adjacent the surface of the photoreceptor.

A metering blade is typically an angled, somewhat resilient blade urged against the surface of the developer roll along a longitude thereof. The purpose of the metering blade is to smooth out the layer of toner particles on sleeve so that the layer will be uniform when it is brought into contact with photoreceptor, and also to charge the toner. Disposed at the free end of metering blade is a compressible pad, which is preferably made of polyurethane or silicone rubber. The metering blade may be anchored in position by a blade holder.

A charge/metering ("C/M") blade is typically in continuous contact with the toner particles on the sleeve along one longitude of the developer roll. The C/M blade performs two functions: it allows a uniform metered layer of toner to pass underneath, and at the same time uniformly charges the mechanically metered toner. That is, the action of the toner particles rubbing against the blade and each other while being metered by the blade induces a charge on the toner particles. The uniformity of the nip formed between the blade and the developer roll plays a significant role in creating a uniform charge of toner across the development roll. "Charge sharing" among particles, charge polarity, and charge level are also controlled through the use of charge control additives loosely attached to the surface of the toner particles.

When this thin layer of uniformly-charged particles is obtained, the developer roll advances the toner particles to a development zone adjacent the surface of the photoreceptor. In the development zone, the toner particles adhering magnetically to the developer roll are attracted electrostatically to the latent image recorded on the photoreceptor. AC and DC biases may be applied to the donor roll to enhance and control this process.

The invention is further illustrated by the following examples, which should not be construed as further limiting the subject invention.

EXAMPLE 1

An example coating formulation is comprised of:

| | |
|---|---|
| Graphite (Timcal DS-1010) (g) | 210 |
| Carbon Black (Columbia Conductex 975) (g) | 82.5 |
| Resin (Neste BB 317) (g) | 895.5 |
| Weight solid resin (g) | 456.7 |
| % solids | 27.9% |
| Water | 1500 |
| Total weight | 2688.0 |

This dispersion is formed by initially mixing the ingredients with a rotor-stator mixer for 3 minutes at 9,000 to 10,000 rpm, and subsequently passing the mixture continuously through a Dynomill for 5 minutes. The dispersion is transferred to a mini-coater and recirculated with periodic coatings made over a period of 24 days. If a decline in coating quality is perceived, then the dispersion is recovered by processing it with a small rotor-stator mixer placed in the overflow chamber of the mini-coater for 10 minutes.

EXAMPLE 2

Use of graphite dispersed in polyacrylamide is demonstrated in the following example. Two coating dispersions have the following formulations:

| | | |
|---|---|---|
| Graphite (Nippon CSPE) (g) | 14.0 | 210 |
| Carbon Black (Columbia Conductex 975) (g) | 5.0 | 75 |
| Resin (Neste BB 317) (g) | 59.7 | 895.5 |
| Weight solid resin (g) | 30.4 | 456.7 |
| % solids | 24.9% | 24.9% |
| Water | 120.0 | 1800 |
| Polyacrylamide* | | 14.6 |
| Total weight | 198.7 | 2980.5 |

*The polyacrylamide is made by Scientific Polymer Products, Inc., Ontario, New York.

Unlike the dispersion without polyacrylamide, the dispersion of the invention exhibits good coating dispersion stability, and the coating is made to be stable for up to a week.

EXAMPLE 3

In this composition, 14.0 g of benzoguanamine formaldehyde 15 micron spheres (L-15 microspheres, Esprit Chemical Co.), 7.0 g of carbon black (Columbia, Conductex 975), 59.7 g of BB 317 phenolic resin (Neste Resins Corp.) and 100 ml deionized water are combined. The mixture is dispersed with a rotor stator mixer at about 12,000 rpm for two minutes. The dispersion is then coated onto aluminum rolls using a cup coating technique. The coatings are made at sleeve withdrawal speeds of 400, 600, and 900 mm/min. The coated sleeve is cured in a horizontal flow convection oven at 150° C. for 10 minutes. The coating coverage is uniform with only occasional defects that are consistent with a trial cup coating.

Most remarkable is that this coating meets donor member specifications in both surface roughness ($R_a$) and thickness. The data from a three point measurement on the 900 mm/min is provided in the following table.

|  | Top | Mid | Bottom | Specification |
| --- | --- | --- | --- | --- |
| Ra | 2.22 | 1.47 | 1.59 | 1.4–2.3 |
| Thickness | 13.7 | 14.9 | 12.6 | 20+/10 $\mu$m |

EXAMPLE 4

14.0 g of polymethyl methacrylate 8 micron spheres cross-linked with ethylene glycol dimethacrylate (Aldrich Chemical Co.), 7.0 g of carbon black (Columbia, Conductex 975), 59.7 g of BB 317 phenolic resin (Neste Resins Corp.), 0.8 g of Foam Blast 191 available from Ross Chemicals, and 100 ml deionized water are combined. The mixture is dispersed with a rotor stator mixer at about 12,000 rpm for two minutes. The inclusion of the anti-foam agent allows the rotor-stator processing to be carried out without excessive foaming.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A waterborne coating composition comprising
   a resin binder comprising a phenolic resin, a conductive particle material, an additional particle material selected from the group consisting of (1) graphite particles with a dispersant of polyacrylamide, polyethylene oxide, polyvinyl alcohol or mixtures thereof and (2) crosslinked polymer particles, and water.

2. The waterborne coating composition according to claim 1, wherein the additional particle material is graphite particles with a dispersant of polyacrylamide, polyethylene oxide, polyvinyl alcohol or mixtures thereof.

3. The waterborne coating composition according to claim 2, wherein the dispersant is polyvinyl alcohol.

4. The waterborne coating composition according to claim 1, wherein the additional particle material is crosslinked polymer particles.

5. The waterborne coating composition according to claim 4, wherein the crosslinked polymer particles comprise crosslinked formaldehyde-containing polymers.

6. The waterborne coating composition according to claim 4, wherein the crosslinked polymer particles comprise crosslinked benzoguanine formaldehyde.

7. The waterborne coating composition according to claim 4, wherein the crosslinked polymer particles are with dispersants, anti-foaming agents, or both.

8. The waterborne coating composition according to claim 1, wherein the phenolic resin is a phenol formaldehyde.

9. The waterborne coating composition according to claim 1, wherein the conductive particle material is selected from the group consisting of carbon black, magnetite, nigrosine and combinations thereof.

10. The waterborne coating composition according to claim 9, wherein the conductive particle material is carbon black.

11. A method of preparing a donor member coating composition, comprising
    mixing a resin binder comprising a phenolic resin, a conductive particle material, an additional particle material selected from the group consisting of (1) graphite particles with a dispersant of polyacrylamide, polyethylene oxide, polyvinyl alcohol or mixtures thereof and (2) crosslinked polymer particles, and water to provide the donor member coating composition.

12. The method according to claim 11, wherein the additional particle material is graphite particles with a dispersant of polyacrylamide, polyethylene oxide, polyvinyl alcohol or mixtures thereof.

13. The method according to claim 12, wherein the dispersant is polyvinyl alcohol.

14. The method according to claim 12, wherein the mixing includes high pressure communition.

15. The method according to claim 14, wherein the high pressure communition is carried out using a high pressure communition device selected from the group consisting of single stage piston homogenizers and two stage piston homogenizers.

16. The method according to claim 11, wherein the additional particle material is crosslinked polymer particles.

17. The method according to claim 16, wherein the crosslinked polymer particles comprise crosslinked formaldehyde-containing polymers.

18. The method according to claim 16, wherein the crosslinked polymer particles comprise crosslinked benzoguanine formaldehyde.

19. The method according to claim 16, wherein the mixing step comprises mixing in a rotor stator mixer.

20. The method according to claim 11, wherein the method further comprises coating the donor member coating composition onto a donor member substrate and then curing to derive a coated donor member.

21. The method according to claim 20, wherein the coating step comprises dip coating or spray coating.

22. A donor member coated with the waterborne coating composition according to claim 1.

23. The donor member according to claim 22, wherein the donor member is in the form of a roll.

24. An image forming apparatus, comprising:
    a charge-retentive surface to receive an electrostatic latent image thereon;
    the donor member according to claim 22 to apply a developer material to the charge-retentive surface to develop the electrostatic latent image to form a developed image on the charge retentive surface;
    a transfer component to transfer the developed image from the charge retentive surface to an image receiving substrate; and
    a fixing component to fuse the transferred developed image to the image receiving substrate.

25. A waterborne coating composition comprising
    a resin binder, a conductive particle material, an additional particle material of crosslinked polymer particles comprising crosslinked formaldehyde-containing polymers, and water.

* * * * *